United States Patent [19]
Marder et al.

[11] Patent Number: 5,804,101
[45] Date of Patent: Sep. 8, 1998

[54] NONLINEAR OPTICAL MATERIALS WITH REDUCED AROMATICITY AND BOND LENGTH ALTERNATION

[75] Inventors: Seth R. Marder, Pasadena, Calif.; Lap-Tak Cheng, Newark, Del.

[73] Assignee: California Institute of Technology, Pasadena, Calif.

[21] Appl. No.: 918,653

[22] Filed: Aug. 22, 1997

Related U.S. Application Data

[63] Continuation of Ser. No. 372,964, Jan. 17, 1995, abandoned, which is a continuation-in-part of Ser. No. 103,281, Aug. 5, 1993, abandoned.

[51] Int. Cl.$^6$ .............................. F21V 9/00; G02F 1/35
[52] U.S. Cl. ..................... 252/582; 252/587; 351/326; 351/328
[58] Field of Search ................... 252/582, 587; 359/326, 328

[56] References Cited

U.S. PATENT DOCUMENTS

| | | |
|---|---|---|
| 3,852,683 | 12/1974 | Webster et al. ............ 331/94.5 L |
| 4,166,740 | 9/1979 | Webster et al. .................. 96/1 |
| 4,605,869 | 8/1986 | Choe . |
| 4,714,838 | 12/1987 | Harelstad et al. . |
| 4,792,208 | 12/1988 | Ulman et al. . |
| 5,011,907 | 4/1991 | Beratan et al. . |
| 5,016,063 | 5/1991 | Bertan et al. . |
| 5,062,693 | 11/1991 | Beratan et al. . |
| 5,126,235 | 6/1992 | Hioki . |
| 5,256,784 | 10/1993 | Francis et al. . |
| 5,272,218 | 12/1993 | Cheng et al. . |
| 5,296,343 | 3/1994 | Hioki et al. . |
| 5,534,201 | 7/1996 | Summers et al. ............ 252/582 |
| 5,670,090 | 9/1997 | Marder et al. ............. 252/582 |
| 5,670,091 | 9/1997 | Marder et al. ............. 252/582 |

FOREIGN PATENT DOCUMENTS 63-270834  10/1988  Japan .

OTHER PUBLICATIONS

CA 116:116383.

Cahill et al., "Chemistry of Anomalous–Dispersion Phase–Matched Second Harmonic Generation," 12 *Am. Chem. Soc.*, 200–213, 1991.

Kondo et al., "Crystal structure of thermally stable non–linear benzalbarbituric acid derivatives," Chem. Phys. Ltrs., vol. 188, n. 3.4, pp. 282–286, 1992.

Ikeda et al., "Second Order Hyperpolarizabilities of Barbituric Acid Derivatives," *Chem. Ltrs.*, pp. 1803–1807, 1989.

Ikeda et al., "Nonlinear optical properties of cyanine dyes," *Chem. Phys. Ltrs.*, vol. 179, n. 5.6, 1991.

Marder et al., Approaches for Optimizing the First Electronic Hyperpolarizability of Conjugated Organic Models, *Science*, vol. 252, pp. 103–106, 1991.

*Primary Examiner*—Shean C. Wu
*Attorney, Agent, or Firm*—Oppenheimer Wolff & Donnelly LLP

[57] ABSTRACT

Compositions for use in non-linear optical devices. The compositions have high first molecular electronic hyperpolarizability ($\beta$) and therefore display high second order non-linear optical properties when incorporated into non-linear optical devices. The acceptor and donor groups which are used in the compositions, along with the $\pi$(pi)-bridge length is chosen to optimize second-order non-linear optical responses.

4 Claims, 1 Drawing Sheet

NONLINEAR OPTICAL MATERIALS WITH REDUCED AROMATICITY AND BOND LENGTH ALTERNATION

This is a continuation of application Ser. No. 08/372,964 filed on Jan. 17, 1996, now abandoned which is a continuation of Ser. No. 08/103,281 filed on Aug. 5, 1993, now abandoned.

The U.S. Government has certain rights in this invention pursuant to Contract No. CHE 9106689, National Science Foundation, and Contract No. AFOSR-ISSA-91-0070 awarded by the United States Air Force/Defense Advanced Research Projects Agency.

BACKGROUND OF THE INVENTION

1. Field of the Invention

The present invention relates generally to materials which exhibit nonlinear optical (NLO) properties. More particularly, the present invention relates to materials which have high first molecular electronic hyperpolarizability ($\beta$) and therefor display high second order nonlinear optical properties.

2. Description of Related Art

Organic materials that show second-order nonlinear optical responses are of interest for a variety of photonic and optoelectronic applications. See Marder, S. R., Sohn, J. E. & Stucky, G. D. eds. *Materials for Nonlinear Optics: Chemical Perspectives,* ACS Symposium Series, Vol. 455(American Chemical Society, Washington, 1991); Chemla, D. S. & Zyss, J. eds *Nonlinear optical properties of Organic Molecules and Crystals,* Vol. 1 and 2 (Academic Press, San Diego, 1987); and Williams, D. J. *Agnew. Chem. Int. Ed. Engl.* 23, 690–703 (1984).

Exemplary nonlinear optical materials and devices which utilize such materials are described in U.S. Pat. Nos. 5,062,693; 5,011,907; and 5,016,063. Nonlinear optical materials are also described in Japanese Patent Appln. No. 63-270834 filed Oct. 28, 1988, and published on May 2, 1990.

Compositions which have been investigated for second order nonlinear properties include barbituric acid derivatives and cyanine dyes. Investigations with respect to barbituric acid derivatives are set forth in a number of literature references. These references include: Chapter 12 of *Materials for Nonlinear Optics: Chemical Perspectives* (supra, pp.200–213); Kondo, K. et al., *Nonlinear Optical Properties of p-Substituted Benzalbarbituric Acids,*—Appl. Phys. Lett. 56, 718 (1990); Ikeda H., et al., *Second Order Hyperpolarizabilities of Barbituric Acid Derivatives,* Chemistry Letters, pp. 1803–1806(1989); and Kondo K., et al., *Crystal Structure of Thermally Stable Non-Linear Benzalbarbituric Acid Derivatives,* Chemical Physics Letters, Vol. 188, No. 3.4, (1992). Investigations with respect to cyanine dyes are set forth in Ikeda, H., et al., *Nonlinear Optical Properties of Cyanine Dyes,* Chemical Physics Letters, Vol. 179, No. 5.6(1991).

Nonlinear optical compositions are also disclosed in U.S. Pat. No. 5,256,784 which issued on Oct. 26, 1994. The disclosed double functional group compositions include a variety of donor groups which are connected together by linkages composed of from 1 to 2 carbon double bonds.

There is a continuing need to develop new materials which have sufficiently high second-order nonlinear optical properties when used in thin films and crystals to make them useful for applications such as telecommunications, optical data storage and optical information processing.

SUMMARY OF THE INVENTION

The present invention provides compositions of matter that have bond length alternations which are selected to provide a high degree of first molecular electronic hyperpolarizability ($\beta$). The compositions of the present invention are useful for incorporation into polymers, Langmuir-Blodgett thin films, self-assembled monolayers or poled polymers. It was discovered in accordance with the present invention that molecules that have degenerate or more nearly degenerate $\pi$ (pi)-electron bridges and do not lose aromaticity upon charge transfer. This diminishes the bond length alternation for given donor-acceptor end groups and provides optimization of $\beta$. Applicants' invention is further based upon the discovery that there is an optimal combination of donors and acceptors which leads to an optimal degree of bond length alternation and therefore optimized $\beta$. In addition, it was discovered that when the number of carbon double bonds linking certain donor group is increased above 2, then an unexpected increase in second-order nonlinear optical properties is observed.

Compositions in accordance with the present invention have the formula

General Formula I wherein A is

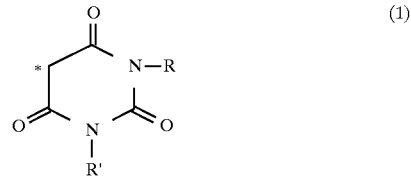

(1)

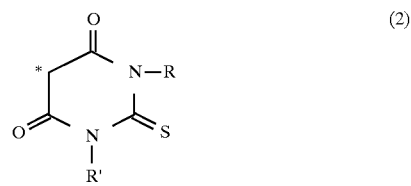

(2)

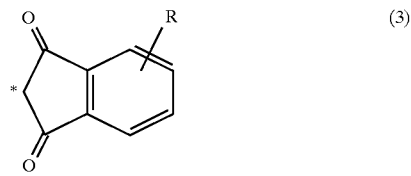

(3)

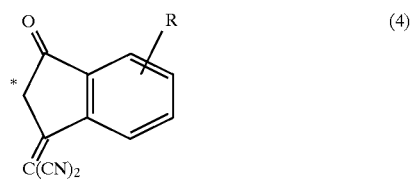

(4)

-continued

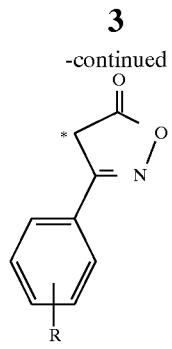   (5)

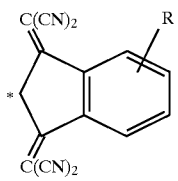   (6)

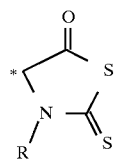   (7)

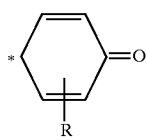   (8)

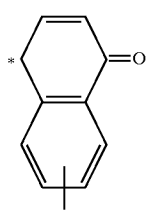   (9)

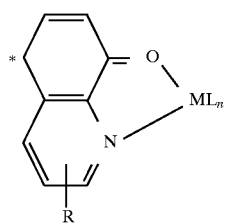   (10)

R is H, allyl, aryl, $(CH_2)_xOH$ where x=1 to 8, or $(CH_2)_x SH$ where x=1 to 8;

R' is H, alkyl, aryl, $(CH_2)_{y'}OH$ where y'=1 to 8, or $(CH_2)_{y'}SH$ where y'=1 to 8;

$ML_n$ is a lewis acid;

wherein B is

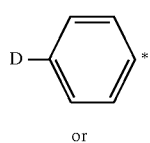   (11)

or

-continued

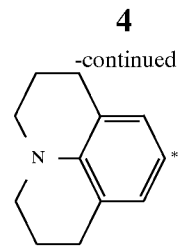   (12)

D is OR", NR" R'" or SR"; where
R" is H, alkyl, aryl or $(CH_2)_wOH$ where w=1 to 8;
R'" is H, alkyl, aryl or $(CH_2)_zOH$ where z=1 to 8;
or where NR" R'" is derived from a cyclic amine of the form $N(CH_2)_l$ where l=3–10, and wherein m is 0 to 15 except, if B is (11), and A is (3), (4), (5), (6), (7), (8), (9) or (10) then, m is 2 to 15;

or if B is (11) and A is (1) or (2), then m=3 to 15 where the asterisk indicates the point of attachment on the acceptor and donor.

As a feature of the present invention, nonlinear optical devices are provided which include compositions of matter which exhibit a high second-order nonlinear optical response. The compositions used in the optical devices are those set forth above and also include compositions having the formula

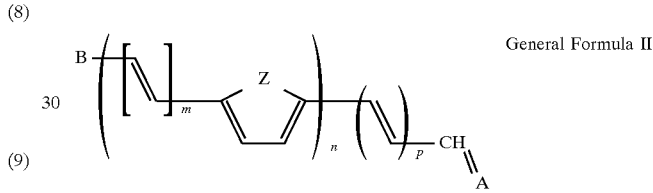   General Formula II wherein Z is CH=CH, O, N, S or Se;
A is

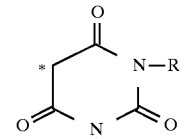   (1)

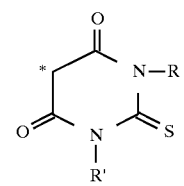   (2)

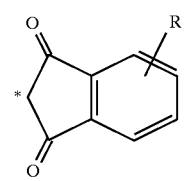   (3)

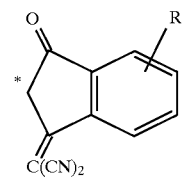   (4)

-continued (5) 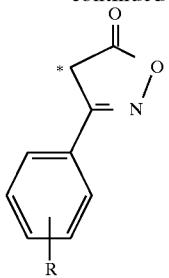

(6) 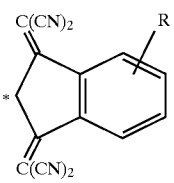

(7) 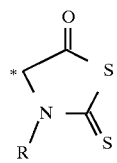

(8) 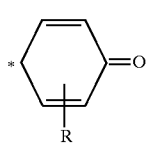

(9) 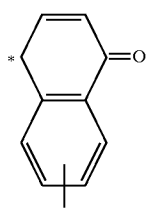

(10) 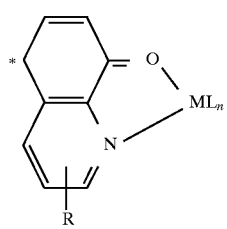

R is H, alkyl, aryl, $(CH_2)_xOH$ where x=1 to 8, or $(CH_2)_xSH$ where x=1 to 8;
R' is H, alkyl, aryl, $(CH_2)_{y'}OH$ where y'=1 to 8, or $(CH_2)_{y''}SH$ where y'=1 to 8;
$ML_n$ is a lewis acid;
wherein B is

(13) 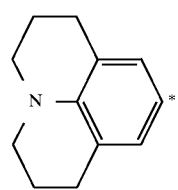

or

-continued

(14) 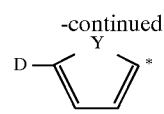

Y is CH=CH, O, N, S or Se;
D is OR", NR" R'" or SR" where
R" is H, alkyl, aryl or $(CH_2)_wOH$ where w=1 to 8;
R'" is H, alkyl, aryl or $(CH_2)_zOH$ where z=1 to 8;
or where NR" R'" is derived from a cyclic amine of the form $N(CH_2)_l$ where l=3–10, and wherein m is 0 to 15, n=0 to 15 and p=1 to 15; except when A is (2) then Y is S, and B is (13) or (14), M=0 to 10, n=0 to 15 and p=1 to 15, where the asterisk indicates the point of attachment on the acceptor and donor.

Further compositions in accordance with the present invention include those having the formula

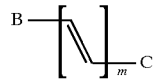

General Formula III wherein C is

(15) 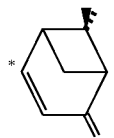

or

(16) 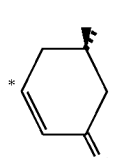

wherein A is (1) 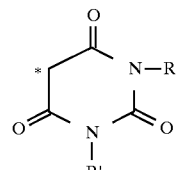

(2) 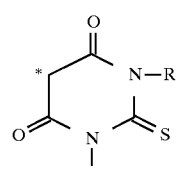

(3) 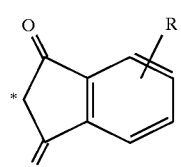

-continued

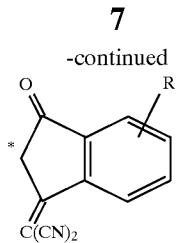
(4)

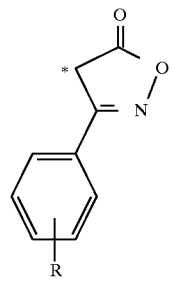
(5)

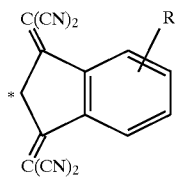
(6)

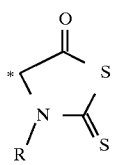
(7)

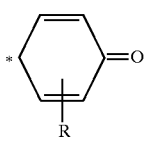
(8)

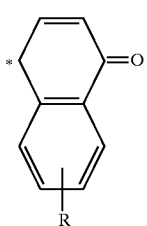
(9)

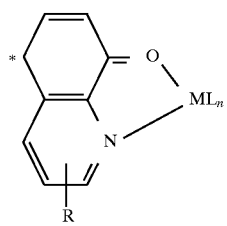
(10)

R is H, alkyl, aryl, $(CH_2)_xOH$ where x=1 to 8, or $(CH_2)_xSH$ where x=1 to 8;

R' is H, alkyl, aryl, $(CH_2)_{y'}OH$ where y'=1 to 8, or $(CH_2)_{y'}SH$ where y'=1 to 8;

$ML_n$ is a lewis acid;

wherein B is

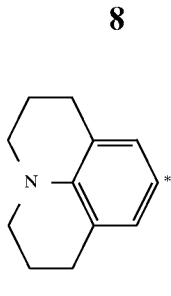
(13)

or

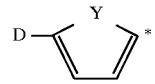
(14)

Y is CH=CH, O, NH, S or Se;
D is OR", NR" R'" or SR" where
R" is H, allyl, aryl or $(CH_2)_wOH$ where w=1 to 8;
R'" is H, alkyl, aryl or $(CH_2)_zOH$ where z=1 to 8;
or where R" R'" is derived from a cyclic amine of the form $N(CH_2)_l$ where l=3–10; and
wherein m is 0 to 15.
where the asterisk indicates the point of attachment on the acceptor and donor.

Applicants' invention focuses on the importance of the conjugated π (pi)-electron bridge in determining second-order non-linear optical responses. As a feature of the present invention, it was discovered that the aromaticity of the bridge in the ground state is an important aspect in determining the degree of bond length alternation and resultant second-order nonlinear optical responses. This is in contrast to previous teachings which typically focused on the aromaticity of molecules on either side of the π (pi) electron bridge. The previous teachings focused on optimizing β by changing the strength of the donor and acceptor moieties (i.e. A and B) with the philosophy being that large β is obtained by using the strongest donors and acceptors.

The above-discussed and many other features and attendant advantages will become better understood by reference to the following detailed description when taken in conjunction with the accompanying drawings.

DETAILED DESCRIPTION OF THE PREFERRED EMBODIMENT

Figure 1:
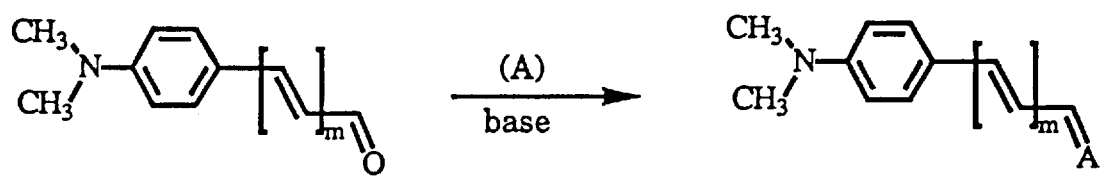
FIG. 1 is a schematic representation of the synthesis of an exemplary composition in accordance with the present invention wherein B is dimethylaminophenyl (11).

The compositions of the present invention are organic materials that show second-order non-linear optical responses. The compositions are incorporated into thin films and crystals in the same manner as other materials which exhibit non-linear optical properties. The compositions, themselves, may exist as crystals, liquids or gases. The compositions may be used alone or in combination with other materials which are conventionally used in non-linear optical devices.

The optical element in accordance with the invention may in some cases consist of a macroscopic crystal of the compound chosen, providing the compound can be made to form crystals in which the polar molecules are in noncentrosymmetric alignment. Such crystals may be grown at a slow rate under equilibrium with their mother liquor by a variety of methods practiced in the art. However, this procedure will not work for many polar molecules due in large part to dipole interactions. Another method of producing a useful optical element involves dissolving the compound in a solvent, which can be placed in a container having the desired shape. The solution can then be subjected to an electrical field which causes the dissolved dipoles to align themselves in the field. Electromagnetic radiation can then be passed through the solution and nonlinear optical effects, such as second harmonic generation, can be produced. Both the presence of an electric field and the need to utilize the compound in liquid solution form may be inconvenient or undesirable in some applications.

A particularly convenient and effective form of the optical element in accordance with the invention involves dispersing the polar molecules in a polymeric binder. The polar molecules can be mixed into the polymeric binder or grated onto the polymer. The mixture can be heated to a temperature at which the polymer becomes sufficiently soft so that upon application of an electrical field the polar molecules line up on the direction of the field. When the mixture cools, the polar molecules are locked into their aligned positions after which the electric field can be removed. Suitable binders include polymethacrylate, poly(methyl methacrylate), poly(vinyl alcohol), copolymers of methyl methacrylate and methacrylic acid, copolymers of styrene and maleic anhydride and half ester-acids of the latter, as well as many others. It is preferred that the polymeric binder of choice be highly transparent so that the transparency of the compounds utilized in the practice of this invention can be advantageously employed.

The poled polymer of this invention are considered particularly useful because of their high concentration of nonlinear optically active molecules, their capability of being formed into large area thin films, and their high orientational stability. Preferred film thickness can vary according to use. Typically film thickness is within the range of $0.5 \mu m - 2 \mu m$.

The poled polymer can also be provided in forms other than films (e.g., a solid block of polymer could be formed into an electrooptic modulator or a frequency converter using conventional techniques known in the art for single crystals) and poled polymer in various forms are included within this invention.

The poled polymers of this invention are preferably shaped to function as nonlinear optical elements for transforming electromagnetic radiation (e.g., by changing the frequency and/or polarization of the radiation). Generally, the nonlinear optical element of a poled polymer is used for transforming electromagnetic radiation by including it within an optical device. A device for transforming electromagnetic radiation using a nonlinear optical element is described in U.S. Pat. No. 4,909,964. The compounds of the present invention may be used in such a device.

A conventional nonlinear optical device disclosed in U.S. Pat. No. 4,909,964 comprises means to direct at least one incident beam of electromagnetic radiation into an element. The element has nonlinear optical properties whereby electromagnetic radiation emerging from the element contains at least one frequency different from the frequency of any incident beam of radiation. The different frequency is an even multiple of the frequency of one incident beam of electromagnetic radiation.

Preferably, the emerging radiation of a different frequency is doubled (second-order) (SHG). Preferably, the electromagnetic radiation is radiation from one of a number of common lasers, such as Nd-YAG, Raman-shifted Nd-YAG, Nd-YLF or Nd-glass, semiconductor diode, Er-Glass, Ti-Sapphire, dye, and Ar or Kr ion, or radiation shifted to other frequencies by nonlinear processes. For example, polarized light of wavelength 1.06 $\mu$m from an Nd-YAG laser is incident on the optical element along the optical path. A lens focuses the light into the optical element. Light emerging from the optical element is collimated by a similar lens and passed through a filter adapted to remove light of wavelength 1.06 $\mu$m while passing light of wavelength 0.53 $\mu$m.

As disclosed in U.S. Pat. No. 4,909,964 (incorporated herein by reference), one conventional electro-optic modulator comprises means to direct a coherent beam into an optical element, and means to apply an electric field ot the element in a direction to modify the transmission property of the beam. For example, in an electro-optic modulator comprising an optical element, a pair of electrodes is attached to the upper and lower surfaces of the element, across which a modulating electric field is applied from a conventional voltage source. The optical element is placed between two polarizers. A light beam (such as that from a Nd-YAG laser) is polarized by a polarizer, focused on the optical element and propagated therethrough, and subjected to modulation by the electric field. The modulate light beam is led out through an analyzer polarizer. Linearly polarized light traversing the optical element is rendered elliptically polarized by action of the applied modulating voltage. The analyzer polarizer renders the polarization linear again. Application of the modulating voltage alters the birefringence of the optical element and consequently the ellipticity impressed on the beam. The analyzer polarizer then passes a greater or lesser fraction of the light beam as more or less of the elliptically polarized light projects onto its nonblocking polarization direction.

It will be further apparent to those skilled in the art that the optical elements formed by the poled polymers of the present invention are useful in this and other devices utilizing their nonlinear properties, such as devices utilizing the electro-optic effect.

One common form the optical element can take is that of a Langmuir-Blodgett (LB) film. A small amount of a compound useful in the practice of this invention spread on the surface of a liquid forms a surface film of monomolecular thickness at the air/liquid interface. If the supporting liquid is a polar liquid, such as water, the hydrophilic moieties of the compound are drawn into the liquid, while the hydrophobic moieties of the compound are attracted to the nonpolar, air side of the interface to hold the polar molecules at the surface of the supporting liquid body, resulting in polar alignment of the polar molecules on the surface of the supporting liquid. When the supporting substrate is slowly immersed in the film bearing liquid body or slowly withdrawn from it, an oriented monomolecular film is formed on the substrate.

The nonlinear optical device according to the invention comprises a means to direct at least one incident of electromagnetic radiation onto an optical element having nonlinear optical properties whereby electromagnetic radiation emerging from the element contains at least one frequency different from the frequency of any incident beam of radiation, the different frequency being an even multiple of the frequency of one incident beam of electromagnetic radiation. The optical element is selected from one of the forms described above. Preferably, the emerging radiation of a different frequency is doubled, i.e. SHG.

The optical element of the invention can also be utilized in an electro-optic modulator, wherein an electric field is applied to the optical element in a direction to modify the transmission properties of the element.

Compositions of matter which are covered by the present invention have the formula:

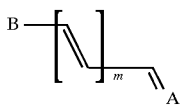

General Formula I wherein A is

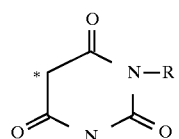  (1)

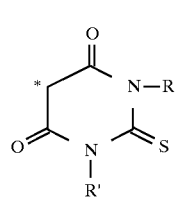  (2)

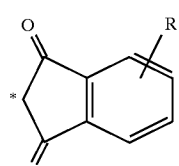  (3)

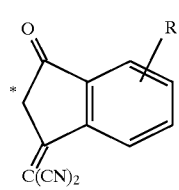  (4)

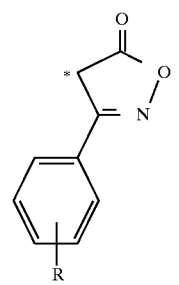  (5)

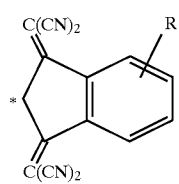  (6)

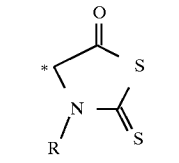  (7)

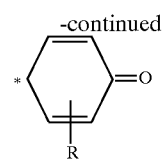  (8)

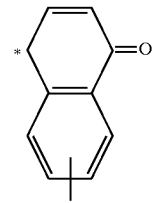  (9)

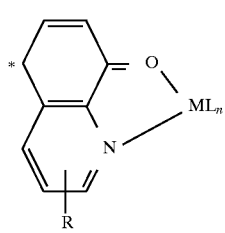  (10)

R is H, alkyl, aryl, $(CH_2)_xOH$ where x=1 to 8, or $(CH_2)_xSH$ where x=1 to 8;

R' is H, alkyl, aryl, $(CH_2)_{y'}OH$ where y'=1 to 8, or $(CH_2)_{y'}SH$ where y'=1 to 8;

n is 0 to 10 and $ML_n$ is a lewis acid;

wherein B is

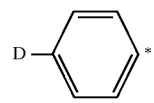  (11)

or

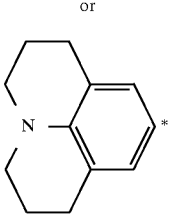  (12)

D is OR", NR" R'" or SR" where

R" is H, alkyl, aryl or $(CH_2)_wOH$ where w=1 to 8;

R'" is H, alkyl, aryl or $(CH_2)_zOH$ where z=1 to 8;

or where NR" R'" is derived from a cyclic amine of the form $N(CH_2)_l$ where l=3–10, and wherein m is 0 to 15 except, if B is (11) and A is (3), (4), (5) (6), (7), (8), (9) and (10), then m is 2 to 15;

or if B is (12) and A is (1), then m is 1 to 15;

or if B is (11) and A is (1) or (2), then m=3 to 15;

where the asterisk indicates the point of attachment on the acceptor and donor.

The present invention is also directed to non-linear optical devices which incorporate compositions of matter having the formula:

General Formula II wherein Z is CH=CH, O, N, S or Se;

A is (1) 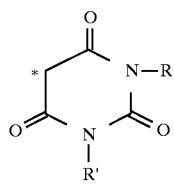

(2) 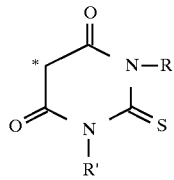

(3) 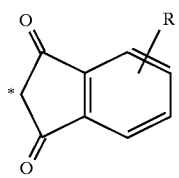

(4) 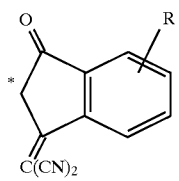

(5) 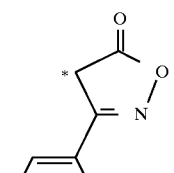

(6) 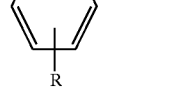

(7) 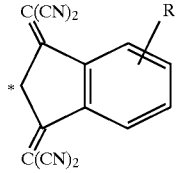

(8) 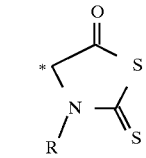

(9) 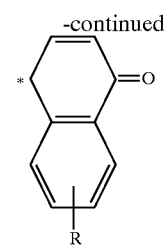

(10) 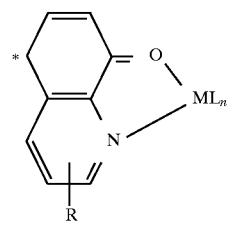

R is H, alkyl, aryl, $(CH_2)_xOH$ where x=1 to 8, or $(CH_2)_xSH$ where x=1 to 8;

R' is H, alkyl, aryl, $(CH_2)_{y'}OH$ where y'=1 to 8, or $(CH_2)_{y'}SH$ where y'=1 to 8;

$ML_n$ is a lewis acid;

where the asterisk indicates the point of attachment on the acceptor and donor.

wherein B is

(13) 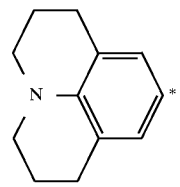

or

(14) 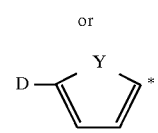

Y is CH=CH, O, N, S or Se;

D is OR", NR" R''' or SR" where

R" is H, alkyl, aryl or $(CH_2)_wOH$ where w=1 to 8;

R''' is H, alkyl, aryl or $(CH_2)_zOH$ where z=1 to 8;

or where NR" R''' is derived from a cyclic amine of the form $N(CH_2)_l$ where l=3–10, and wherein m is 0 to 15, n=0 to 15 and p=1 to 15; except when A is (2) then Y is S, and B is (13) or (14), m=0 to 10, n=0 to 15 and p=15 to 15, where the asterisk indicates the point of attachment on the acceptor and donor.

The present invention is also directed to non-linear optical devices which include compositions of matter having the formula:

General Formula III wherein C is

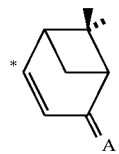

or

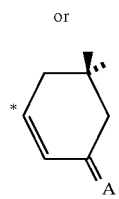

wherein A is (1)
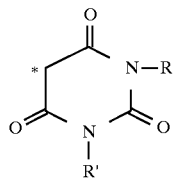

(2)
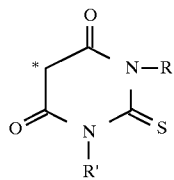

(3)
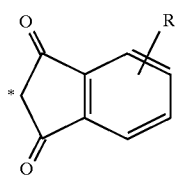

(4)
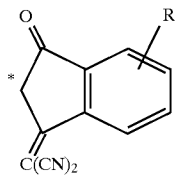

(5)
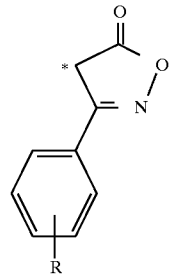

(6)
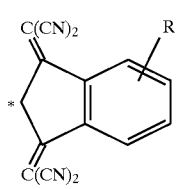

-continued (7)
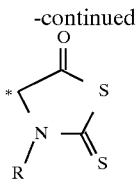

(8)
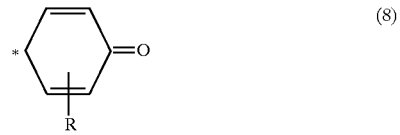

(9)
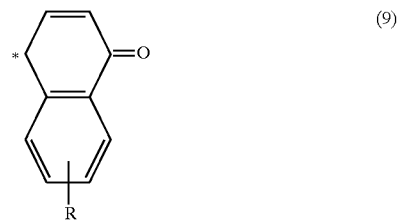

(10)
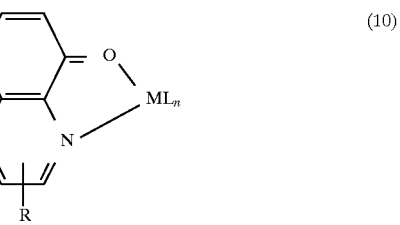

R is H, alkyl, aryl, $(CH_2)_xOH$ where x=1 to 8, or $(CH_2)_xSH$ where x=1 to 8;
R' is H, alkyl, aryl, $(CH_2)_{y'}OH$ where y'=1 to 8, or $(CH_2)_{y'}SH$ where y'=1 to 8;
$ML_n$ is a lewis acid;
wherein B is

(13)
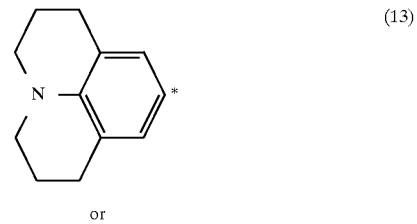

or

(14)

Y is CH=CH, O, N, S or Se;
D is OR", NR" R'" or SR" where
R" is H, alkyl, aryl or $(CH_2)_wOH$ where w=1 to 8;
R'" is H, alkyl, aryl or $(CH_2)_zOH$ where z=1 to 8;
or where R" R'" is derived from a cyclic amine of the form $N(CH_2)_l$ where l=3–10, and
wherein m is 0 to 15.
where the asterisk indicates the point of attachment on the acceptor and donor.

Alkyl groups set forth in the above formulas include those groups having up to 10 carbon atoms and includes both branched and straight chain alkyl groups. Exemplary alkyl groups include methyl, ethyl, propyl, butyl, pentyl, hexyl, heptyl, octyl, nonyl, in the normal, secondary, iso and neo attachment isomers. Aryl groups referred to in the preceding formulas include aromatic hydrocarbons having up to 10 carbon atoms. Exemplary aryl groups include phenyl, naphthyl, furanyl, thiophenyl, pyrrolyl, selenophenyl, tellurophenyl. The abbreviation $ML_n$ refer to Lewis acids. Exemplary Lewis acids include $(CH_3)_2$ Zn, $(CH_3)_3Al$, $(CH_3)_3Ga$, $(CH_3)_3B$ $Cl_3Al$, $Cl_3Ga$, and $Cl_3B$.

Figure 2:
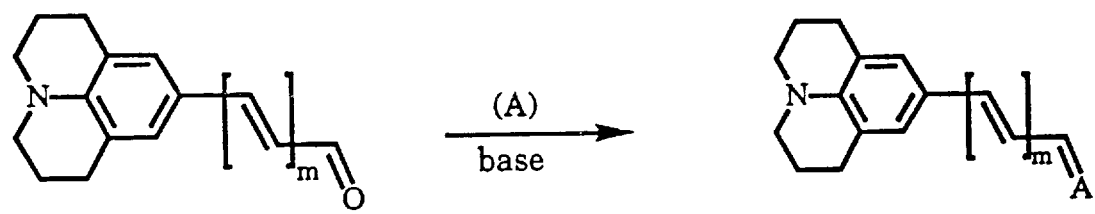
FIG. 2 is a schematic representation of the synthesis of an exemplary composition wherein B is julolidinyl (12).

The compositions of the present invention are prepared by reacting an appropriate acceptor (A) with B—(CH=CH)$_n$CHO under standard Knoevenagel conditions. As schematically shown in FIG. 1 for the exemplary case where B is dimethylaminophenyl (11). FIG. 2 is a schematic representation of the synthesis where B is julolidinyl (12).

A compound in accordance with the present invention was prepared where A was diethylthiobarbituric acid (2) and B was dimethylaminophenyl (11). The procedure which was used to prepare this composition was as follows:

Preparation of the product is carried out by a conventional Knoevenagel reaction wherein (7-4-dimethylamino-phenyl)-hepta-2, 4, 6-triene-1-al (1.41 mmol) is completely dissolved in approximately 100 mls of ethanol. 10 mls of a warm ethanol solution of 1, 3-diethyl thiobarbituric acid (1.11 mmol is added to the dissolved (7-4-dimethylamino-phenyl)-hepta-2, 4, 6-triene-1-al. This causes a gradual darkening of color. The mixture is then set in an oil bath at 90° C. and 0.5 mls of piperidine is added with stirring. The color of the solution immediately darkens. The solution is then refluxed generally for one hour or until thin layer chromatography (TLC) indicates the reaction is complete. The mixture is cooled and diluted with petroleum ether and the product is filtered and washed with ethanol/petroleum ether and then with petroleum ether. The yield is 0.435 gram (1.06 mmol, 95%) of dark green fluffy powder. The powder may be recrystallized from mixtures of dichloromethane/petroleum ether or from ethanol/petroleum ether.

In an alternate procedure, the (7-4-dimethylamino-phenyl)-hepta-2, 4, 6-triene-1-al is combined in 10 mls of ethanol and 30 mls of chloroform with 1.0 gram of isophorone-thiobarbituric acid derivative C, where A=(2) and R=R'=ethyl (3.12 mmol and 1 g ammonium acetate) in a Schlenk flask. The flask is filled with argon twice and sealed. The mixture is then evacuated and left to sit one day at room temperature in the dark. The resulting dark blue solution is washed with water (2×30 mls) followed by drying with magnesium sulfate. Solvent is removed from the solution under vacuum. The remaining residue is chromatographed on silica gel using 3% ethyl acetate/97 % hexane as an eluant. The first blue band gave after evaporation of solvent a materials corresponding to a composition having the formula of the present invention where A is 2 R=R' is ethyl, C is 16 and m is 4 and B is (14), where Y is CH=CH and D is $(CH_3)_2N$.

A number of exemplary compositions in accordance with the present invention were prepared following the above-described procedure. The results of spectroscopic and elemental analysis for the various compositions are as follows:

EXAMPLE 1

General Formula I

A=diethyl barbituric acid (1)

B=dimethylaminophenyl (11)

m=3

$^1$H NMR (CD$_3$COCD$_3$) δ 7.98 (m, 2H), 7.43 (dm, J=8.8 Hz, 2H), 7.39 (m, 1H), 7.04 (dd, J=14.3, 10.5 Hz, 1H), 6.93 (m, 2H), 6 dd, J=14.2, 11.8 Hz, 1H), 3.93, 3.92 (each q, J=7.0 Hz, 2H), 3.01 (s, 6H), 1.16, 1.15 (each t, J=7.0 Hz, 3H). Anal. Calcd. for C$_{23}$H$_{27}$N$_3$O$_3$: C, 70.21; H, 6.92; N, 10.68. Found: C, 70.26; H, 6.95; N, 10.67. $\lambda_{max}$ (solvent, nanometers): cyclohexane, 522; toluene, 546; chloroform, 572; methylene chloride, 562; acetone, 542; methanol, 560; N-methyl-2-pyrrolidone, 569.

EXAMPLE 2

General Formula I

A=diethyl barbituric acid (1)

B=julolidinyl (12)

m=1

$^1$H NMR (CD$_3$COCD$_3$) δ 8.36 (dd, J=14.8, 12.4 Hz, 1H), 8.05 (dd, J=12.5, 0.6 Hz, 1H), 7.44 (d, J=14.8 Hz, 1H), 7.20 (s, 2H), 3.94, 3.92 (each q, J=7.0 Hz, 2H), 3.37 (apparent t, J=5.8 Hz, 4H), 2.76 (apparent t, J=6.3 Hz, 4H), 1.95 (m, 4H), 1.17, 1.15 (each t, J=7.0 Hz, 3H). $^{13}$C NMR δ 162.77, 162.24, 158.30, 157.87, 151.04, 147.13, 130.05, 122.55, 121.25, 119.58, 108.62, 50.19, 36.87, 36.28, 27.48, 21.20, 13.48, 13.43. $\lambda_{max}$ (solvent, nanometers): cyclohexane, 529; chloroform, 574. Anal. Calcd. for C$_{23}$H$_{27}$N$_3$O$_3$: N, 10.68. Found: N, 10.64.

EXAMPLE 3

General Formula I

A=diethyl barbituric acid (1)

B=julolidinyl (12)

m=2

$^1$H NMR (CD$_2$Cl$_2$) δ 8.04 (d, J=12.5 Hz, 1H) 7.94 (dd, J=13.9, 12.6 Hz, 1H), 7.28 (apparent ddd, J=13.9, 7.9, 2.9 Hz, 1H), 6.99 (s, 2H), 6.92 (m, 2H), 3.96, 3.96 (each q, J=7.0 Hz, 2H), 3.27 (apparent t, J=5.8 Hz, 4H), 2.73 (apparent t, J=6.3 Hz, 4H), 1.94 (m, 4H), 1.19 (m, 6H). $\lambda_{max}$ (solvent, nanometers): cyclohexane, 540; chloroform, 616.

EXAMPLE 4

General Formula I

A=diethylthio barbituric acid (2)

B=dimethylaminophenyl (11)

m=3

$^1$H NMR δ 8.09 (d, J=12.6 Hz, 1H), 8.00 (apparent t, J=13.3 Hz, 1H), 7.39 (d, J=9.0 Hz, 2H), 7.25 (dd, J=14.0, 11.7 Hz, 1H), 6.96 (dd, J=14.4, 10.2 Hz, 1H), 6.85 (d, J=15.1 Hz, 1H), 6.81 (dd, J=15.1, 10.2 Hz, 1H), 6.67 (d, J=9.0 Hz, 2H), 6.59 (dd, J=14.3, 11.7 Hz, 1H), 4.55, 4.54 (each q, J=7.0 Hz, 2H), 3.04 (s, 6H), 1.30 (m, 6H). $^{13}$C NMR δ 178.75, 160.87, 159.87, 157.99, 157.27, 151.19, 147.82, 142.07, 130.07, 129.28, 128.31, 124.30, 123.92, 112.10, 112.00, 43.58, 43.05, 40.15, 12.42 (coincident). Anal. Calcd. for C$_{23}$H$_{27}$N$_3$O$_2$S: C, 67.45; H, 6.65; N, 10.26. Found: C, 67.48; H, 6.71; N, 10.18. $\lambda_{max}$ (solvent, nanometers): cyclohexane, 556; toluene, 588; chloroform, 624; methylene chloride, 612; acetone, 592; methanol, 608; N-methyl-2-pyrrolidone, 634.

EXAMPLE 5

General Formula I

A=diethylthio barbituric acid (2)

B=julolidinyl (12)

m=1

$^1$H NMR (CD$_3$COCD$_3$) δ 8.40 (dd, J=14.5, 12.7 Hz, 1H), 8.10 (dd, J=12.6, 0.5 Hz, 1H), 7.56 (d, J=14.5 Hz, 1H), 7.27

(br s, 2H), 4.52, 4.50 (each q, J=6.9 Hz, 2H), 3.43 (apparent t, J=5.8 Hz, 4H), 2.78 (apparent t, J=6.5 Hz, 4H), 1.96 (m, 4H), 1.25, 1.22 (each t, J=6.9 Hz, 3H). $^{13}$C NMR δ 178.60, 161.37, 160.46, 159.38, 159.18, 147.99, 130.78, 122.74, 121.46, 120.11, 108.46, 50.33, 43.41, 42.86, 27.40, 21.04, 12.49, 12.41. Anal. Calcd. for $C_{23}H_{27}N_3O_2S$: C, 67.45; H, 6.65; N, 10.26; S, 7.83. Found: C, 67.18; H, 6.67; N, 10.24; S, 7.77. $\lambda_{max}$ (solvent, nanometers): cyclohexane, 563; chloroform, 614 (log ε, 5.08).

EXAMPLE 6

General Formula I

A=diethylthio barbituric acid (2)

B=julolidinyl (12)

m=2

$^1$H NMR δ ($CD_2Cl_2$) 8.07 (d, J=12.8 Hz, 1H), 7.98 (apparent t, J=13.2 Hz, 1H), 7.37 (dd, J=14, 11.0 Hz, 1H), 7.03 (br s, 2H), 6.98 (m, 2H), 4.54 (m, 4H), 3.30 (apparent t, J=5.8 Hz, 4H), 2.73 (apparent t, J=6.3 Hz, 4H), 1.95 (m, 4H), 1.27, 1.25 (each t, J=7.0 Hz, 3H). Anal. Calcd. for $C_{25}H_{29}N_3O_2S$: C, 68.94; H, 6.71; N, 9.65; S, 7.36. Found: C, 69.03; H, 6.76; N, 9.63; S, 7.42. $\lambda_{max}$ (solvent, nanometers): cyclohexane, 580; chloroform, 684.

EXAMPLE 7

General Formula I

A=diethylthio barbituric acid (2)

B=julolidinyl (12)

m=3

$^1$H NMR δ 8.08 (d, J=12.7 Hz, 1H), 7.98 (apparent t, J=13.3 Hz, 1H), 7.25 (dd, J=13.8, J=11.9 Hz, 1H), 6.96, (bs, 2H), 6.95 (m, 1H), 6.55 (dd, J=14.1, J=11.8 Hz, 1H), 4.55, 4.54 (each q, J=6.9 Hz, 2H), 3.25 (apparent t, J=5.7 Hz, 4H), 2.74 (apparent t, J=6.3 Hz, 4H), 1.96 (m, 4H), 1.31, 1.29 (each t, J=7.3 Hz, 3H). $^{13}$C NMR δ 178.05, 161.05, 160.04, 157.97, 157.91, 148.80, 144.72, 143.22, 129.39, 127.81, 127.30, 123.39, 123.09, 121.28, 111.35, 50.02, 43.58, 43.04, 27.67, 21.53, 12.48, 12.44; EIMS, m/z 461(M, 2), 327(47), 199(54), 186(100), 170(32), 97(24), 69(34); EI HRMS m/z (calcd for $C_{27}H_{31}N_3O_2S$: 461.2150), 461.2137. Anal. Calcd. for $C_{27}H_{31}N_3O_2S$: C, 70.25; H, 6.77; N, 9.10; S. 6.95. Found: C, 70.03; H, 6.80; N, 9.00; S, 6.83.

EXAMPLE 8

General Formula I

A=indandione (3)

B=dimethylaminophenyl (11)

m=2

$\lambda_{max}$ (solvent, nanometers): toluene, 536; chloroform, 556; methylene chloride, 552; acetone, 542; methanol, 560; N-methyl-2-pyrrolidone, 570.

EXAMPLE 9

General Formula I

A=indandione (3)

B=dimethylaminophenyl (11)

m=3

$^1$H NMR δ 7.91 (m, 2H), 7.83 (dd, J=14.3, 12.5 Hz, 1H), 7.73 (m, 2H), 7.53 (d, J=8.9 Hz, 2H), 7.37 (dm, J=8.9 Hz, 2H), 7.10 (dd, J=14.5, 11.5 Hz, 1H), 6.80 (m, 3H), 6.67 (dm, J=8.9 Hz, 2H), 6.60 (dd, $J_1+J_2$=25.17 Hz, 1H), 3.02 (s, 6H). $\lambda_{max}$ (solvent, nanometers): cyclohexane, 524; toluene, 550; chloroform, 572; methylene chloride, 570; acetone, 552; methanol, 568; N-methyl-2-pyrrolidone, 580.

EXAMPLE 10

General Formula I

A=indandione (3)

B=julolidinyl (12)

m=1

$^1$H NMR δ 8.21 (dd, J=14.8, 12.4 Hz, 1H), 7.88, 7.70 (each m, 2H), 7.62 (d, J=12.3 Hz, 1H), 7.21 (d, J=14.9 Hz, 1H), 7.17 (br. s, 2H), 3.30 (apparent t, J=5.7 Hz, 4H), 2.76 (apparent t, J=6.2 Hz, 4H), 1.97 (m, 4H). $\lambda_{max}$ (solvent, nanometers): cyclohexane, 541.

EXAMPLE 11

General Formula I

A=indandione (3)

B=julolidinyl (12)

m=2

$^1$H NMR δ 7.89 (m, 2H), 7.82 (dd, $J_1+J_2$=26.75 Hz, 1H), 7.70 (m, 2H), 7.54 (d, J 12.6 Hz, 1H), 7.17 (dd, J=14.3, 10.8 Hz, 1H), 6.99 (br. s, 2H), 6.92 (dd, J=15.0, 10.7 Hz, 1H), 6.85 (d, J=15.1 Hz, 1H), 3.25 (apparent t, J=5.7 Hz, 4H), 2.74 (apparent t, J=6.3 Hz, 4H), 1.97 (m, 4H).

EXAMPLE 12

General Formula I

A=3-phenyl-5-isoxazolone (5)

B=dimethylaminophenyl (11)

m=2

$^1$H NMR δ ($CD_2Cl_2$) 7.81 (dd, J=14.1, 12.3 Hz, 1H), 7.57 (m, 5H,), 7.43 (d m, J=9.0 Hz, 2H), 7.40 (dd, J=12.6, 0.5 Hz, 1H), 7.18 (apparent dddd, J=14.3, 7.4, 3.3, 0.4 Hz, 1H), 7.00 (m, 2H), 6.69 (d m, J=9.0 Hz, 2H), 3.04 (s, 6H); $^{13}$C NMR (125.8 MHz) δ 170.21, 162.40, 154.61, 151.92, 149.73, 145.57, 130.53, 130.02, 129.06, 128.31, 128.24, 124.72, 123.93, 123.72, 112.70, 112.09, 40.08; Anal. Calcd. for $C_{22}H_{20}N_2O_2$: C, 76.72; H, 5.85; N, 8.13. Found: C, 76.67; H, 5.90; N, 8.08. $\lambda_{max}$ (solvent, nanometers): cyclohexane, 508; toluene, 538; chloroform, 562; methylene chloride, 564; acetone, 553; methanol, 570; N-methyl-2-pyrrolidone, 580.

EXAMPLE 13

General Fonnula I

A=3-phenyl-5-isoxazolone (5)

B=dimethylaminophenyl (11)

m=3

$^1$H NMR δ ($CD_2Cl_2$) 7.78 (dd, J=14.3, 12.3 Hz, 1H), 7.58 (m, 5H), 7.37 (m, 3H), 7.09 (dd, J=14.4, 11.6 Hz, 1H), 6.90 (apparent ddd, J=14.1, 7.0, 3.8 Hz, 1H), 6.82 (m, 2H), 6.67 (d m, J=9.0 Hz, 2H), 6.62 (dd, J=13.6, 11.6 Hz, 1H), 3.01 (s, 6H, ); $^{13}$C NMR (125.8 MHz) δ 170.01, 162.37, 153.50, 151.22, 149.35, 146.27, 141.14, 130.59, 129.81, 129.09, 129.07, 128.22, 128.17, 125.64, 124.48, 123.97, 113.40, 112.12, 40.15. Anal. Calcd. for $C_{24}H_{22}N_2O_2$: C, 77.81; H, 5.99; N, 7.56. Found: C, 77.89; H, 6.02; N, 7.53. $\lambda_{max}$ solvent, nanometers): cyclohexane, 534; toluene, 558; chloroform, 582; methylene chloride, 578; acetone, 566; methanol, 576; N-methyl-2-pyrrolidone, 592.

EXAMPLE 14

General Formula I

A=3-phenyl-5-isoxazolone (5)
B=julolidinyl (12)
m=0

$^1$H NMR (CD$_3$COCD$_3$) δ 8.08 (v br s, 2H), 7.58 (m, 5H), 7.31 (s, 1H), 3.46 (apparent t, J=5.8 Hz, 4H), 2.73 (apparent t, J=6.2 Hz, 4H), 1.95 (m, 4H); $^{13}$C NMR δ 164.85, 150.89, 149.27, 135.55, 135.49, 129.96, 128.97, 128.79, 128.73, 121.05, 120.85, 107.03, 50.43, 27.32, 20.82; Anal. Calcd. for C$_{22}$H$_{20}$N$_2$O$_2$: C, 76.72; H, 5.85; N, 8.13. Found: C, 76.82; H, 5.87; N, 8.09. $\lambda_{max}$ (solvent, nanometers): cyclohexane, 476; chloroform, 504.

EXAMPLE 15

General Formula I

A=3-phenyl-5-isoxazolone (5)
B=julolidinyl (12)
m=1

$^1$H NMR (CD$_3$COCD$_3$) δ 8.12 (dd J=14.7, 12.2Hz, 1H), 7.66 (m, 2H), 7.61 (dd, J=12.2, 0.6 Hz, 1H), 7.56 (m, 3H), 7.42 (d, J=14.6 Hz, 1H), 7.17 (s, 2H), 3.38 (apparent t, J=5.8 Hz, 4H), 2.75 (apparent t, J=6.2 Hz, 4H), 1.94 (m, 4H). $^{13}$C NMR (125.8 MHz) δ 171.10, 162.47, 155.21, 150.82, 147.26, 130.16, 129.85, 128.86, 128.72, 128.13, 122.34, 121.37, 117.40, 108.89, 50.16, 27.42, 21.10; Anal. Calcd. for C$_{24}$H$_{22}$N$_2$O$_2$: C, 77.81; H, 5.99; N, 7.56. Found: C, 77.79; H, 6.00; N, 7.49. $\lambda_{max}$ (solvent, nanometers): cyclohexane, 517; chloroform, 586.

EXAMPLE 16

General Formula I

A=3-phenyl-5-isoxazolone (5)
B=julolidinyl (12)
m=2

$^1$H NMR (CD$_3$COCD$_3$) δ 7.75 (dd J=14.1, 12.6 Hz, 1H), 7.66 (m, 2H), 7.58 (dd, J=12.6, 0.6 Hz, 1H), 7.57 (m, 3H), 7.42 (dd, J=14.2, J=11.1 Hz, 1H), 7.11 (s, 2H), 7.09 (dd J=13.9, 11.0 Hz, 1H), 7.01 (d, J=14.0 Hz, 1H), 3.30 (apparent t, J=5.7 Hz, 4H), 2.72 (apparent t, J=6.2 Hz, 4H), 1.92 (m, 4H). Anal. Calcd. for C$_{26}$H$_{24}$N$_2$O$_2$: C, 78.76; H, 6.10; N, 7.07. Found: C, 78.64; H, 6.16; N, 7.05. $\lambda_{max}$ (solvent, nanometers): cyclohexane, 554; chloroform, 620.

EXAMPLE 17

General Formula I

A=3-phenyl-5-isoxazolone (5)
B=julolidinyl (12)
m=3

$^1$H NMR δ 7.79 (dd J=14.1, 12.4 Hz, 1H), 7.59 (m, 2H), 7.52 (m, 3H), 7.32 (d, J=12.4 Hz, 1H), 7.04 (dd, J=14.3, J=11.7 Hz, 1H), 6.94 (s, 2H), 6.84 (apparent dd J=14.1, 9.8 Hz, 1H), 6.73 (m, 2H), 6.55 (dd J=14.0, 11.7 Hz, 1H), 3.24 (apparent t, J=5.7 Hz, 4H), 2.73 (apparent t, J=6.2 Hz, 4H), 1.96 (m, 4H). $^{13}$C NMR δ 21.51, 27.62, 49.91, 112.12, 121.19, 122.91, 123.25, 124.98, 126.97, 128.99, 130.45, 142.20, 144.46, 147.24, 149.44, 154.14, 163.06; Anal. Calcd. for C$_{28}$H$_{26}$N$_2$O$_2$: C, 79.59; H, 6.20; N, 6.63. Found: C, 79.51; H, 6.15; N, 6.61.

EXAMPLE 18

General Formula III

A=diethylthio barbituric acid (2)
B=dimethylaminophenyl (11)
C=isophorone (16)
m=1

$^1$H NMR (CD$_3$COCD$_3$) δ 8.38 (s, 1H), 7.59 (dm, J=8.8 Hz, 2H), 7.27 (d, J=15.9 Hz, 1H), 7.06 (dd, J=15.9, 0.5 Hz, 1H), 6.76 (dm, J=9.0 Hz, 2H), 4.48 (br, 4H), 3.09 (s, 2H), 3.04 (s, 6H), 2.54 (s, 2H) 1.23 (br m, 6H), 1.04 (s, 6H).

EXAMPLE 19

General Formula III

A=diethylthio barbituric acid (2)
B=dimethylaminophenyl (11)
C=isophorone (16)
m=2

$^1$H NMR δ 8.32 (s, 1H), 7.37 (dm, J=8.7 Hz, 2H), 6.98 (m, 1H), 6.79 (m, 2H), 6.70 (br, 2H), 6.60 (d, J=15.1 Hz, 1H), 4.54, 4.51 (each q, J=6.8 Hz, 2H), 3.08 (s, 2H), 3.03 (s, 6H), 2.40 (s, 2H) 1.31, 1.29 (each t, J=6.9 Hz, 3H), 1.04 (s, 6H).

EXAMPLE 20

General Formula III

A=diethylthio barbituric acid (2)
B=dimethylaminophenyl (11)
C=isophorone (16)
m=3

$^1$H NMR δ 8.31 (s, 1H), 7.35 (dm, J=8.6 Hz, 2H), 6.90 (dd, J=15.0, J=11.2, 1H), 6.77 (dd, J=15.2, 10.6 Hz, 1H), 6.70 (br, 2H), 6.68 (dd, J=14.2, 10.7 Hz, 1H), 6.66 (d, J=15.2 Hz, 1H), 6.56 (d, J=15.1 Hz, 1H), 6.43 (dd, J=14.1, 11.2 Hz, 1H), 4.55, 4.51 (each q, J=7.0 Hz, 2H), 3.07 (s, 2H), 3.01 (s, 6H), 2.38 (s, 2H) 1.31, 1.29 (each t, J=7.0 Hz, 3H), 1.04 (s, 6H).

EXAMPLE 21

General Formula III

A=diethylthio barbituric acid (2)
B=dimethylaminophenyl (11)
C=isophorone (16)
m=4

$^1$H NMR δ 8.30 (s, 1H), 7.32 (dm, J=8.6 Hz, 2H), 6.87 (dd, J=15.0, J=11.1, 1H), 6.72 (dd, J=15.2, 10.9 Hz, 1H), 6.67 (br d, J=8.0 Hz, 2H), 6.61 (dd, J=14.5, 11.3 Hz, 1H), 6.60 (d, J=15.6 Hz, 1H), 6.56 (dd, J=14.4, 10.7Hz, 1H), 6.56 (d, J=15.2 Hz, 1H), 6.39 (dd, J=14.2, 11.5 Hz, 1H), 6.39 (dd, J=14.5, 11.2 Hz, 1H), 4.54, 4.51 (each q, J=6.9 Hz, 2H), 3.07 (s, 2H), 3.00 (s, 6H), 2.36 (s, 2H) 1.31, 1.29 (each t, J=7.0 Hz, 3H, 1.04 (s, 6H).

EXAMPLE 22

General Formula II

A=diethylthiobarbituric acid, (2)
B=(14) with Y=S, D=piperidinyl
m=n=p=0

Anal. Calcd. for $C_{18}H_{23}N_3O_2S_2$: C, 57.27; H, 6.14; N, 11.13; S, 16.99. Found: C, 57.10; H 6.20; N, 11.22; S, 16.82. High resolution MS calcd. for $C_{18}H_{23}N_3O_2S_2$: 377.1225. Found: 377.1232.

EXAMPLE 23

General Formula II

A=5-phenyl-3-isoxazolone, (5)

B=(14) with Y=S, D=piperidinyl, m=1, n=1, Z=S, p=0

$^1$H NMR (CD$_2$Cl$_2$) δ 7.78 (s, 1H), 7.60 (m, 6H), 7.38 (d, J=15.3 Hz, 1H), 7.08 (d, J=4.2 Hz, 1H), 6.98 (d, J=4.2 Hz, 1H), 6.65 (d, J=15.4 Hz, 1H), 5.98 (d, J=4.0 Hz, 1H), 3.27 (t, J=5.6 Hz, 4H), 1.71 (m, 4H), 1.62 (m, 2H). Anal. Calcd. for $C_{25}H_{22}N_2O_2S_2$: C, 67.24; H, 4.97; N, 6.27; S, 14.36. Found: C, 67.26; H, 4.99; N, 6.26; S, 14.29.

EXAMPLE 24

General Formula II

A=diethylthiobarbituric acid, (2)

B=(14) with Y=S, D=piperidinyl, m=1, n=1, Z=S, p=1

$^1$H NMR (CD$_2$Cl$_2$) δ 8.28 (dd, J=14.5, 2.2 Hz, 1H), 8.11 (d, J=12.2 Hz, 1H), 7.55 (d, J=14.5 Hz, 1H), 7.33 (d, J=4.1 Hz, 1H, ), 7.16 (d, J=15.3 Hz, 1H), 6.96 (d, J=4.0 Hz, 1H), 6.90 (d, J=4.1 Hz, 1H), 6.62 (d, J=15.4 Hz, 1H), 5.97 (d, J=4.20 Hz, 1H), 4.53 (m, 4H), 3.25 (t, 4H, J=5.7 Hz), 1.70 (m, 4H), 1.61 (m, 2H), 1.26 (m, 6H).

Four different compounds produced by the above-described procedure were analyzed to determine first molecular hyperpolarizabilities. The results of these determinations are set forth in Tables 1–4. Tables 1–3 show the measured β for the three exemplary compounds in accordance with the present invention. Table 4 sets forth measurements for a compound not covered by the present invention wherein A=CH=CH—C$_6$H$_4$NO$_2$.

TABLE 1

General Formula I
A = CH - diethylthiobarbituric acid (2)
B = dimethylaminophenyl (11)

| m | # of atoms conjugated | λmax (nm) | $\mu/10^{-18}$ (esu) | $\beta/10^{-30}$ (esu) | $\beta(0)/10^{-30}$ (esu) | $\mu\beta/10^{-48}$ (esu) | $\mu\beta(0)/10^{-48}$ (esu) |
|---|---|---|---|---|---|---|---|
| 0 | 9 | (484) | 5.4 | 68 | 48 | 370 | 259 |
| 1 | 11 | (572) | 5.7 | 256 | 150 | 1457 | 855 |
| 2 | 13 | (604) | 6.2 | 636 | 347 | 3945 | 2151 |
| 3 | 15 | (624) | 6.6 | 1490 | 772 | 9831 | 5095 |

TABLE 2

General Formula I
A = 3 - phenyl-5-isoxazolone (5)
B = dimethylaminophenyl (11)

| m | # of atoms conjugated | λmax (nm) | $\mu/10^{-18}$ (esu) | $\beta/10^{-30}$ (esu) | $\beta(0)/10^{-30}$ (esu) | $\mu\beta/10^{-48}$ (esu) | $\mu\beta(0)/10^{-48}$ (esu) |
|---|---|---|---|---|---|---|---|
| 0 | 9 | (478) | 8.3 | 27 | 56 | 312 | 221 |
| 1 | 11 | (530) | 8.6 | 140 | 90 | 1202 | 771 |
| 2 | 13 | (562) | 8.7 | 362 | 218 | 3156 | 1895 |
| 3 | 15 | (582) | 8.9 | 918 | 528 | 8171 | 4696 |

TABLE 3

General Formula I
A = CHC$_6$H$_4$NO$_2$
B = dimethylaminophenyl (11)

| m | # of atoms conjugated | λmax (nm) | $\mu/10^{-18}$ (esu) | $\beta/10^{-30}$ (esu) | $\beta(0)/10^{-30}$ (esu) | $\mu\beta/10^{-48}$ (esu) | $\mu\beta(0)/10^{-48}$ (esu) |
|---|---|---|---|---|---|---|---|
| 0 | 13 | (430) | 6.6 | 73 | 55 | 482 | 363 |
| 1 | 15 | (442) | 7.6 | 107 | 80 | 813 | 608 |
| 2 | 17 | (458) | 8.2 | 131 | 95 | 1074 | 779 |
| 3 | 19 | (464) | 9 ± 1 | 190 ± 35 | 133 ± 35 | 1700 ± 400 | 1197 ± 250 |

TABLE 4

General Formula I
A = CH - diethylthiobarbituric acid (2)
B = julolidinyl (12)

| m | # of atoms conjugated | λmax (nm) | $\mu/10^{-18}$ (esu) | $\beta/10^{-30}$ (esu) | $\beta(0)/10^{-30}$ (esu) | $\mu\beta/10^{-48}$ (esu) | $\mu\beta(0)/10^{-48}$ (esu) |
|---|---|---|---|---|---|---|---|
| 0 | 9 | (522) | 7.0 | 87 | 56 | 609 | 394 |
| 1 | 11 | (614) | 6.6 | 355 | 186 | 2210 | 1159 |
| 2 | 13 | (680) | 6.3 | 1141 | 490 | 7152 | 3069 |
| 3 | 15 | (686) | 8.8 | 2169 | 911 | 19086 | 8019 |

As can be seen from the above Tables, compounds in accordance with the present invention (Table 1–3) have large first molecular hyperpolarizabilities (β) in comparison with the compound set forth in Table 4. For example, the results in Table 4 show that this exemplary composition in accordance with the present invention has a β (0) of 911×10$^{-30}$ esu (after correcting for dispersion with a two state model). This is to be compared with the compound in Table 2 which has a β (0) of 133×10$^{-30}$ esu. The Tables show that when the number of carbon double bonds which link the two functional groups together is increased, the first hyperpolarizabilities unexpectedly increases.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A nonlinear electro-optical device comprising:

A) an element comprising a composition of matter which exhibits a second-order nonlinear optical response, said composition having the formula:

wherein A is

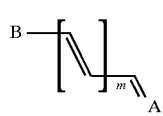

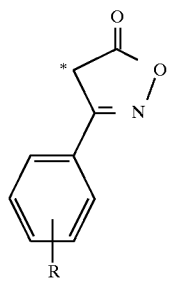

R is H, alkyl or aryl;
wherein B is

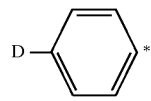

D is OR", NR"R'" or SR"; where

R" is aryl;

R'" is aryl;

or where NR" or R'" are derived from a cyclic amine of the form $N(CH_2)_l$ where l=3–10, and wherein m is 2 or 3; and where the asterisk indicates the point of attachment on the acceptor and donor; and B) means for directing at least one incident beam of electromagnetic radiation having at least one frequency into said element whereby electromagnetic radiation emerging from said element has at least one frequency which is different from said at least one frequency of said incident beam of electromagnetic radiation.

2. A nonlinear electro-optical device according to claim 1 wherein said means for directing said incident beam of radiation is a laser.

3. A nonlinear electro-optical device according to claim 1 wherein R is H or ethyl.

4. A nonlinear electro-optical device according to claim 1 wherein said element comprises a thin film or a crystal.

* * * * *